Oct. 3, 1950    J. R. MENTZER    2,524,325
MULTIVOLTAGE REGULATED POWER SUPPLY
Filed July 11, 1947
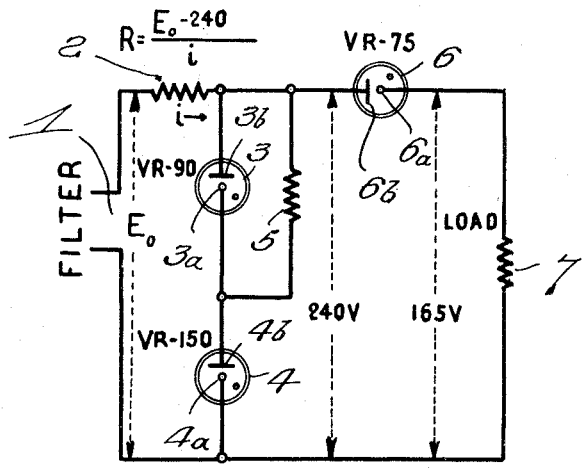
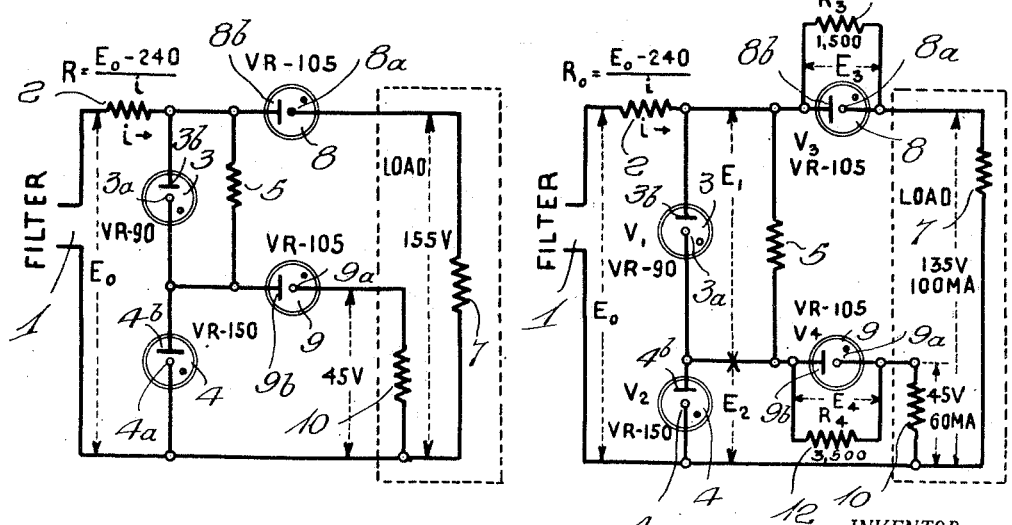
INVENTOR.
JOHN R. MENTZER
BY
John B. Brady
ATTORNEY Patented Oct. 3, 1950

2,524,325

UNITED STATES PATENT OFFICE 2,524,325

MULTIVOLTAGE REGULATED POWER SUPPLY

John R. Mentzer, State College, Pa., assignor, by mesne assignments, to the Pennsylvania Research Corporation, a corporation of Pennsylvania Application July 11, 1947, Serial No. 760,261

5 Claims. (Cl. 323—16)

1

This invention relates broadly to multivoltage power supply systems and more particularly to a gaseous voltage-regulator tube system for delivering selected values of voltages from conventional power supply systems.

One of the objects of this invention is to provide a method for deriving by processes of integration and differentiation selected voltage values from conventional power supply systems.

Another object of this invention is to provide a circuit arrangement for a multiplicity of gaseous voltage-regulator tubes for deriving by the coaction thereof selected voltages by processes of algebraic addition and/or subtraction from conventional power supply systems.

Still another object of this invention is to provide circuit arrangements involving permutations and combinations of gaseous voltage-regulator tubes in power distribution circuits for deriving selected voltages from conventional power supply circuits.

A still further object of this invention is to provide a circuit arrangement for combining a multiplicity of coacting gaseous voltage-regulator tubes of different voltage regulation characteristics for deriving by the cooperative action thereof selected voltages from a conventional power supply source.

Other and further objects of this invention reside in the method of deriving selected voltages from a plurality of coacting gaseous voltage-regulator tubes and circuit arrangements for the electrical connection of such tubes as set forth more fully in the specification hereinafter following by reference to the accompanying drawings, in which:

Figure 1 diagrammatically illustrates one method of combining a multiplicity of gaseous voltage-regulator tubes for obtaining by integration and differential operation thereof selected voltages from a conventional power supply source; Fig. 2 illustrates a modified circuit arrangement for deriving by integration and differentiation sum and difference voltages over a wider voltage range than is obtainable in the circuit illustrated in Fig. 1; and Fig. 3 illustrates a further modified circuit arrangement for deriving by processes of addition and subtraction selected voltage values over a still wider range of voltages as related to a conventional power supply source.

Several values of stable D. C. voltage are often required for the testing of equipment which is normally battery operated. This invention provides an improved method and means for obtaining from a conventional power supply system selected D. C. voltages by use of gaseous voltage-regulator tubes, of the types for example as tubes designated VR–75, VR–90, VR–105 and VR–150. The use of these tubes makes it possible to secure any regulated voltage which is a multiple of 15 volts, up to the nearest multiple of 15 volts below the available output voltage from the power supply filter, which is necessary for ignition of the gaseous tubes.

To obtain the various voltages it is necessary to use the tubes in permutations and combinations wherein the voltages across some of the tubes are added and the voltages across others of the tubes are subtracted. An integration or differentiation operation is obtained in the coacting voltage-regulator tube circuits. The problem of securing the desired voltage is one of finding two combinations of 75, 90, 105, and 150 volts whose difference is the desired voltage. Either combination may involve any or all of the four voltages. For example, assume that it is desired to have 165 volts regulated output. This may be obtained by subtracting 75 volts from the sum of 150 volts and 90 volts.

The method of obtaining the sum of any voltages is to arrange the voltage-regulator tubes in series across the line with an appropriate dropping resistor in series with the tubes. The subtraction of any voltage from this sum is then accomplished by arranging the combination of tubes whose voltage total is to be subtracted in series with the load. Fig. 1 shows a circuit arrangement for deriving an output of 165 volts. Reference character 1 designates the filtered output circuit of a conventional power supply system connected through resistor 2 with two gaseous voltage-regulator tubes 3 and 4 of the VR–90 and VR–150 types arranged in series with each other and in shunt across the input or filter circuit 1. Tubes 3 and 4 contain cold cathodes 3a and 4a and anodes 3b and 4b, respectively. The cold cathode 4a connects to one side of the filter circuit while the anode 4b of tube 4 connects to the cold cathode 3a of tube 3. The anode 3b of tube 3 connects to the other side of the input or filter circuit 1 with resistor 2 in series therewith. Tube 3 is shunted by resistor 5. A third cold cathode voltage-regulator tube 6 has the anode 6b thereof connected with the circuit leading from anode 3b of tube 3. Tube 6 is disposed in series with the line leading from the shunt path containing tubes 3 and 4 to the load designated at 7. The voltages obtained are designated at the different parts of the circuit.

In case more than one voltage output from a given power supply is desired, the method may be extended. Although the problem may be somewhat more complex, depending upon the output voltages desired, the same procedure is applied. As an example, it might be desirable to have a power supply to be used for testing equipment which is designed to operate from batttery voltages of 135 volts and 45 volts. Fig. 2 shows a circuit for securing these voltage values. The higher voltage may be established by subtracting the voltage across tube 9, identified as a VR-105 gaseous voltage-regulator tube, from the sum of the voltages across VR-150 tube and a VR-90 tube in series as shown at 3 and 4 in Fig. 2. The 45 volts may be obtained by subtracting the voltage across the VR-105 tube 9 from the voltage across the VR-150 tube 4 which is in series with the VR-90 tube designated at 3.

In the circuit of Fig. 2 more current would normally flow through the VR-90 tube 3 than would flow through the VR-150 tube 4, so it is advisable to shunt the VR-90 tube 3 with a resistor 5 which will carry the excess current at the voltage established across it by the VR-90 tube 3 which it shunts. This equalizes the current operating ranges of the tubes 3 and 4 in series.

The load current range for the circuit is determined by the fact that the current through the input series line resistor 2 must be constant to produce the constant drop between the filter output circuit 1 and the two VR tubes 3 and 4 in series across the line. As the load currents are caused to vary in any order, the current through the VR-150 tube 4 must vary by an amount equal and opposite to the algebraic sum of the load current variations. Since the current through the VR-150 tube 4 must not be less than 5 ma. and not greater than 40 ma., the sum of the load current variations cannot be greater than 35 ma.

Although the current range of the single VR-150 tube 4 sets a limit on the total variation of load current, the magnitude of the load currents avaliable may be increased by shunting the series dropping tubes by suitable resistance. For example, if it is desired to have a load current of 100 ma. available at 135 volts and 60 ma. at 45 volts an additional voltage-regulator tube of type VR-105 designated at 9 in the 135-volt line should be shunted with a resistor which will carry the current in excess of the rated current through the VR-105 tube 9. The load supplied by the co-action of tubes 4 and 9 is designated at 10.

Fig. 3 illustrates a further permutation and combination arrangement of gaseous voltage-regulator tubes for obtaining other voltage ranges.

If 100 ma. is the maximum current required at 135 volts, a current well up in the operating range of the VR-105 tube 8 may be selected. By allowing 30 ma. through the tube a resistor 11 is provided which must carry the remaining 70 ma. at 105 volts. This would require a resistor of 1500 ohms for shunting the VR-105 tube 8 as shown at 11 in Fig. 3.

If a current in the VR-105 tube 9 in the 45-volt line is selected at 30 ma., this would then require a shunting resistor 12 which would carry the remaining 30 ma. of load current 105 volts or a resistance of 3000 ohms across this VR-105 tube 9. The series dropping resistor 2 would then have to carry the total load current of 160 ma. plus the current through the VR-150 tube 9.

If the 160-ma. load current is the maximum load current of a range of load currents, the current in the VR-150 tube 9 shrould be of a minimum operating value. This would assume the maximum compensating value of the VR-150 tube 4 current as it increases with decreasing total load current. Assuming a current in the VR-150 tube 4 of 10 ma., the total filter current will be 160 ma. plus 10 ma. or 170 ma.

The series dropping resistor at the filter output is computed by application of Ohm's law:

$$R = \frac{E_0 - 240}{0.170} \text{ ohms}$$

where $E_0$ is the output voltage of the filter 1 and 240 volts is the voltage across the VR-90 and VR-150 tubes 3 and 4 in series.

The VR-90 tube 3 should then be shunted by an equalizing resistor 5 to make the currents of the VR-90 tube 3 and the VR-150 tube 4 equal. The resistor 5 must carry all of the load current of the 45-volt output. This is 60 ma. and the resistor voltage across resistor 5 will be 90 volts as determined by the tube 3. The resistor 11 will be 1500 ohms as indicated in Fig. 3.

If the load current requirement from a regulator of this type is too low in one or more branches, a shunting bleeder of suitable resistance may be employed to increase the load drain to an operable value in the load branches involved, as represented at 7 and 10.

Since the low voltage is obtained by taking the difference between two larger voltages, this may yield a larger tolerance on low output voltage on a percentage basis than the rated percentage tolerance of any of the individual tube voltages. The tolerance in volts, however, will not be greater than the sum of the voltage tolerances of the tubes which determine the low output voltage.

Table 1 set forth hereinafter gives a general method of solving for the circuit components

*Table 1—Procedure for computing values*

| | Step | Method |
|---|---|---|
| 1 | Compute $R_4$ | $R_4 = \dfrac{2E_4}{i_{L-max}+i_{L-min}-i_{t-max}-i_{t-min}}$ |
| 2 | Compute $R_3$ | $R_3 = \dfrac{2E_3}{i_{h-max}+i_{h-min}-i_{t-max}-i_{t-min}}$ |
| 3 | Compute $i_{R4}$ | $i_{R4} = i_L - i_t$ |
| 4 | Compute $i_{R3}$ | $i_{R3} = i_h - i_t$ |
| 5 | Compute $R_0$ | $R_0 = \dfrac{\bar{E}_0 - E_1 - E_2}{i_{R4}+i_{R3}+3i_t}$ |
| 6 | Compute $R_1$ | $R_1 = \dfrac{E_1}{\dfrac{\bar{E}_0-E_1-E_2}{R_0} - i_{R3} - 2i_t}$ |
| 7 | Compute limit on $i_{h-max}$ | $i_{h-max} \leq i_h + i_{t-max} - i_t$ |
| 8 | Compute limit on $i_{h-min}$ | $i_{h-min} \geq i_h - (i_t - i_{t-min})$ |
| 9 | Compute limit on $i_{L-max}$ | $i_{L-max} \leq i_L + i_{t-max} - i_t$ |
| 10 | Compute limit on $i_{L-min}$ | $i_{L-min} \geq i_L - (i_t - i_{t-min})$ |
| 11 | Compute upper limit of $E_{0-max}$ | $E_{0-max} \leq (E_1+E_2) + R_0(i_{h-min}+i_{L-min}+i_{t-max})$ |
| 12 | Compute lower limit of $E_{0-min}$ | $E_{0-min} \geq (E_1+E_2) + R_0(i_{h-max}+i_{L-max}+i_{t-min})$ |
| 13 | Compute $Z_{AC}$ back from high-voltage load | $Z_{hAC} \doteq R_{3AC} + R_{1AC} + R_{2AC}$ |
| 14 | Compute $Z_{AC}$ back from low-voltage load | $Z_{LAC} \doteq R_{1AC} + R_{2AC}$ |

$i_{h-max}$ and $i_{h-min}$ respectively, are the maximum and minimum values of the high voltage load current.
$i_{L-max}$ and $i_{L-min}$ respectively, are the maximum and minimum values of low voltage load current.
$i_{t-max}$ and $i_{t-min}$ respectively, are the maximum and minimum rated gas tube operating currents.
Denote the average values of all varying quantities by a bar above the quantity symbol, e. g., $\bar{E}_{0-ave} = \bar{E}_0$.
Denote the A.C. resistance of a given tube by $R_{AC}$, e. g., for $V_1$ use $R_{1AC}$.

when two output voltages and the extreme values of load currents are specified. Certain restrictions must necessarily be put on the output current variations. The solution yields the permissible input voltage variation for the range of load currents desired, and the internal A. C. impedance looking back from the load.

The component symbols used in the foregoing Table 1 apply to the circuit arrangement of Fig. 3. Measured values of regulation were 2 volts variation of the 135-volt output and 1.3 volts variation of the 45-volt output for an A. C. line voltage variation from 105 volts to 125 volts.

While I have described my invention in certain preferred embodiments I realize that modifications may be made in the manner of combining the gaseous voltage-regulator tubes as set forth herein and I desire that it be understood that no limitations upon my invention are intended other than may be imposed by the scope of the appended claims.

What I claim is:

1. A power distribution system comprising a direct current source, a multiplicity of gaseous voltage-regulator tubes of differing voltage regulation characteristics arranged in a series electrical path and connected across said source, taps at each end of said series path and a tap intermediate said gaseous voltage-regulator tubes, a load circuit, separate additional gaseous voltage-regulator tubes of voltage characteristics differing from the voltage characteristics of said first mentioned gaseous voltage-regulator tubes interposed between one of the taps at the end of said series electrical path and different portions of said load circuit and between the tap intermediate said gaseous voltage-regulator tubes and said load circuit, and resistors arranged in shunt with said separate additional gaseous voltage-regulator tubes and in series between said series electrical path and said load circuit, said gaseous voltage-regulator tubes coacting by the characteristics thereof to differentially derive predetermined voltages at said load circuit.

2. A power distribution system comprising a direct current source, a multiplicity of gaseous voltage-regulator tubes of differing voltage-regulation characteristics arranged in a series electrical path and connected across said source, taps at each end of said series path and a tap intermediate said gaseous voltage-regulator tubes, a resistor disposed in series with said source and the tap at one end of said series electical path, a load circuit, separate additional gaseous voltage-regulator tubes of voltage characteristics differing from the voltage characteristics of said first mentioned gaseous voltage-regulator tubes interposed between one of the taps at the end of said series electrical path and said load circuit and between the tap intermediate said gaseous voltage-regulator tubes and said load circuit, a resistor in shunt with one of the gaseous voltage-regulator tubes in said series electrical path and resistors in shunt with said separate additional gaseous voltage-regulator tubes and in series between said load circuit and said series electrical path, said gaseous voltage-regulator tubes coacting by the characteristics thereof to differentially derive predetermined voltages at said load circuit.

3. A power distribution system comprising a direct current source, a multiplicity of gaseous voltage-regulator tubes of differing voltage regulation characteristics, each of said tubes including a cold cathode and anode disposed in a gas-enclosing envelope, a series connected circuit extending across said source and including a connection between one side of said source and the cold cathode of one of said tubes, a tap connected with said last mentioned cold cathode, a connection between the anode of said last mentioned tube and the cold cathode of an adjacent tube, a connection between the anode of said last mentioned tube and the other side of said source, a tap in said last mentioned connection, a separate tap connected with the anode of said last mentioned tube, separate additional gaseous voltage-regulator tubes each including a cold cathode and an anode disposed in a gase-enclosing envelope, said separate additional gaseous voltage-regulator tubes differing in voltage characteristics from the voltage characteristics of the gaseous voltage-regulator tubes in said first mentioned series connected circuit, load circuits, individual connections between the anodes of said separate additional gaseous voltage-regulator tubes and the individual taps in the circuit including said first mentioned gaseous voltage-regulator tubes and connections between the cathodes of said separate additional gaseous voltage-regulator tubes and the load circuits, said gaseous voltage-regulator tubes coacting by the characteristics thereof to differentially derive predetermined voltages at said load circuit.

4. A power distribution system comprising a direct current source, a multiplicity of gaseous voltage-regulator tubes of differing voltage regulation characteristics, each of said tubes including a cold cathode and anode disposed in a gas-enclosing envelope, a series connected circuit extending across said source and including a connection between one side of said source and the cold cathode of one of said tubes, a tap connected with said last mentioned cold cathode, a connection between the anode of said last mentioned tube and the cold cathode of an adjacent tube, a connection between the anode of said last mentioned tube and the other side of said source, a tap in said last mentioned connection, a separate tap connected with the anode of said last mentioned tube, separate additional gaseous voltage-regulator tubes each including a cold cathode and an anode disposed in a gase-enclosing envelope, said separate additional gaseous voltage-regulator tubes differing in voltage characteristics from the voltage characteristics of the gaseous voltage-regulator tubes in said first mentioned series connected circuit, load circuits, individual connections between the anode of said separate additional gaseous voltage-regulator tubes and the individual taps in the circuit including said first mentioned gaseous voltage-regulator tubes and connections between the cathodes of said separate additional gaseous voltage-regulator tubes and the load circuits, and a resistor connected in shunt with the cold cathode and anode of each of said separate additional gaseous voltage-regulator tubes, said gaseous voltage-regulator tubes coacting by the characteristics thereof to differentially derive predetermined voltages at said load circuit.

5. A power distribution system comprising a direct current source, a multiplicity of gaseous voltage-regulator tubes of differing voltage regulation characteristics, each of said tubes including a cold cathode and anode disposed in a gas-enclosing envelope, a series connected circuit extending across said source and including a connection between one side of said source and the anode of one of said tubes, a tap connected with said last mentioned anode, a connection between the cold cathode of said last mentioned tube and the anode of an adjacent tube, a tap in said connection, a connection between the cold cathode of said last mentioned tube and the other side of said source, a separate tap connected with the cold cathode of said last mentioned tube, separate additional gaseous voltage-regulator tubes each including a cold cathode and an anode disposed in a gas-enclosing envelope, said separate additional gaseous voltage-regulator tubes differing in voltage characteristics from the voltage characteristics of the gaseous voltage-regulator tubes in said first mentioned series connected circuit, load circuits, individual connections between the anodes of said separate additional gaseous voltage-regulator tubes and the individual taps in the circuit including said first mentioned gaseous voltage-regulator tubes, connections between the cathodes of said separate additional gaseous voltage-regulator tubes and the load circuits, a resistor connected between said first and last mentioned taps and interconnecting the anodes of all of said gaseous voltage-regulator tubes.

JOHN R. MENTZER.

REFERENCES CITED

The following references are of record in the file of this patent:

UNITED STATES PATENTS

| Number | Name | Date |
|---|---|---|
| 1,973,082 | Koros | Sept. 11, 1934 |
| 2,141,654 | Kott | Dec. 27, 1938 |
| 2,320,237 | Hopper | May 25, 1943 |
| 2,337,911 | Mayer et al. | Dec. 28, 1943 |
| 2,434,069 | Goldberg | Jan. 6, 1948 |